Figure 1:
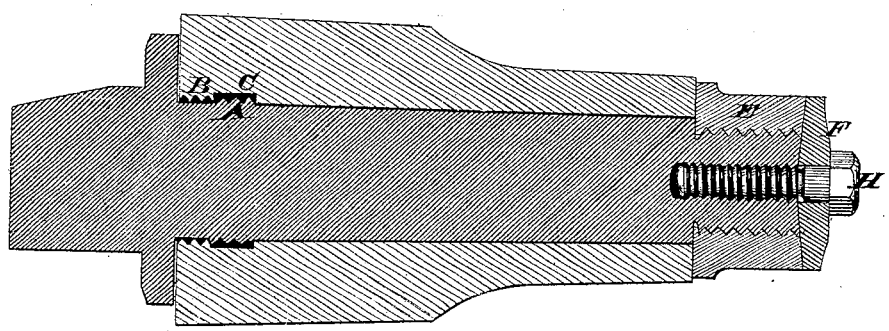
Figure 2:
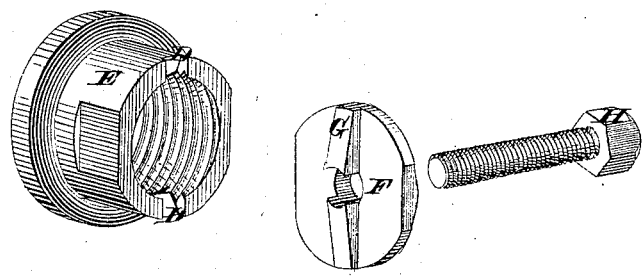
Figure 2:
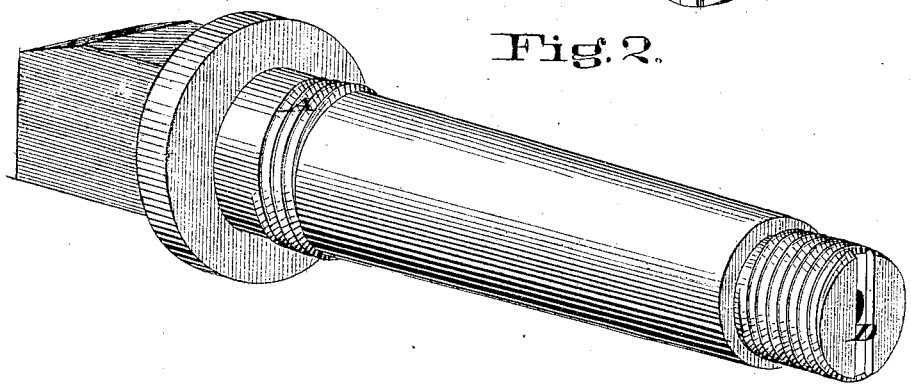

I. BICKNELL.
MODE OF SECURING CARRIAGE WHEELS ON THEIR AXLES.

No. 105,298. Patented July 12, 1870.

United States Patent Office.

IRA BICKNELL, OF CINCINNATI, OHIO.

Letters Patent No. 105,298, dated July 12, 1870.

IMPROVED MODE OF SECURING CARRIAGE-WHEELS ON THEIR AXLES.

The Schedule referred to in these Letters Patent and making part of the same

*To all whom it may concern:*

Be it known that I, IRA BICKNELL, of Cincinnati, in the county of Hamilton in the State of Ohio, have invented a new, useful, and improved Mode of Preventing Wagon or Carriage-Wheels from Coming Off from the Axle; and I do hereby declare that the following is a full and exact description thereof, reference being had to the accompanying drawings and to the letters of reference marked thereon.

The nature of my invention consists in providing or making a screw upon a wagon or carriage-axle, near its shoulder, and a corresponding nut or screw in box of wheel; also, a cap or piece of metal, provided with a set-screw at point or outer end of axle; all of which is to prevent the wheel coming off from the axle.

To enable others skilled in the art to make and use my invention, I will proceed to describe its construction and operation.

I construct my wagon or carriage-axles and box or hub for same in any of the known forms, and apply thereto nuts, linch-pins, and the other appendages of such axles and boxes; but, in order to obviate the danger or possibility of the wheel coming off from the axle by loss or absence of nut, linch-pin, or other fastening at outer end of axle, I make or place a screw around the axle, near its shoulder, as shown at A in accompanying drawings; and to fit this screw, I make a corresponding nut or screw in the inside of the box of the hub of wheel, as shown at B in drawings.

I make also, adjoining the nut, a recess or groove, C, in the inside of box of sufficient width to receive the screw A, on the axle, after it has passed the nut B.

The axle and box are put together by inserting the end of the axle in the box of the hub of wheel, and turning the wheel around until the nut B, inside the box, has passed entirely over the screw A on the axle, and the said screw A rests in the groove C in the box, and the screw B in the box occupies the space between the screw A and the shoulder of the axle, when the wheel is free to revolve, and cannot be taken off except by reversing the movement by which it was placed upon the axle.

I do not confine myself to any specific number of threads or number of times to be passed around the axle, but in general I make the screw of one thread passing twice around the axle, and a corresponding one in the box, which makes it necessary for the wheel to be turned backward two complete revolutions before it can come off or be taken off from axle, and this screw on axle I make a left- or right-handed one, according to the revolution required of wheel when in use; that is, I make it a right-handed one, when the wheel is to turn to the right, and a left-handed one, when the wheel is to turn to the left; also, as additional security to be used in connection with aforedescribed screw or separately therefrom, I make, in outer end of axle and nut E on same, a slot or groove, D, at right angles to the axle, and fit to same a cap or piece of metal, F, with a tongue, G, fitting said slot or groove D, said cap or piece of metal being secured to its place by screw H inserted through it into the end of the axle, as shown.

This tongued plate and screw serve to render it almost impossible for the nut to run off the axle by either friction or jar.

I claim herein as new and of my invention—

1. In the described combination with the recess C and the screw-threaded end B of the box, the screw-threaded collar A of the axle, for the purpose specified.

2. The groove D in the nut E, and upon the end of the axle, the plate or collar F, having the tongue formed thereon, and screw H, combined and arranged in the manner and for the purpose specified.

In testimony of which invention I hereunto set my hand.

IRA BICKNELL.

Witnesses:
 WILLIAM F. HANSELMANN,
 ANTHONY HIMY,
 O. F. SHEPARD.